Apr. 17, 1923.  
A. T. J. BAHR  
LUG RING  
Filed Oct. 12, 1922  
1,451,804
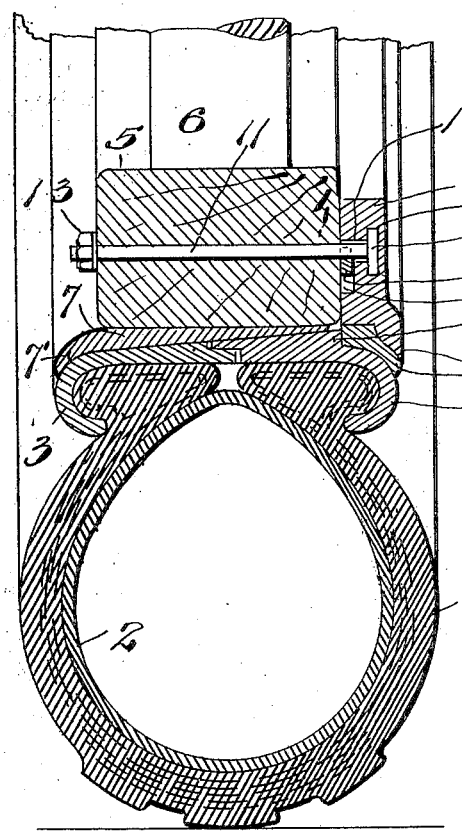
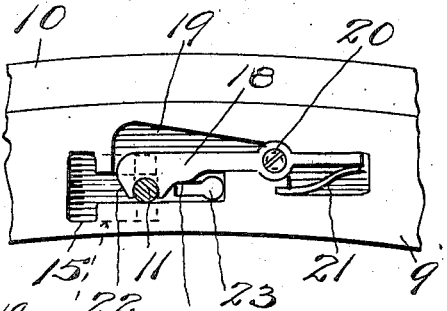
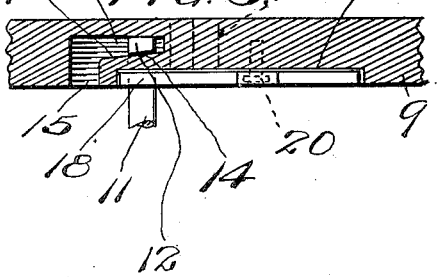
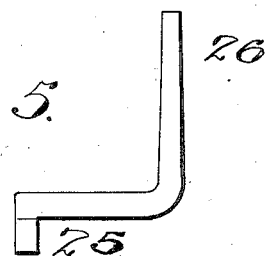
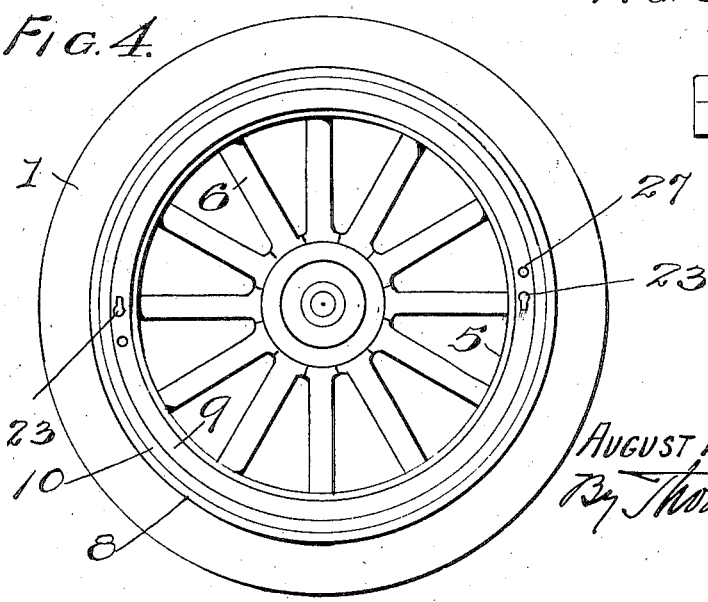
Inventor  
AUGUST T. J. BAHR.  
By Thomas R. Harney  
Attorney Patented Apr. 17, 1923.

1,451,804

UNITED STATES PATENT OFFICE.

AUGUST T. J. BAHR, OF DETROIT, MICHIGAN, ASSIGNOR OF ONE-HALF TO CLAIRE BENTON KLINE, OF DORMONT, PENNSYLVANIA.

LUG RING.

Application filed October 12, 1922. Serial No. 593,936.

*To all whom it may concern:*

Be it known that I, AUGUST T. J. BAHR, a citizen of the United States of America, residing at Detroit, in the county of Wayne and State of Michigan, have invented certain new and useful Improvements in Lug Rings, of which the following is a specification.

My present invention relates to improvements in lug rings for use in connection with demountable rims of automotive vehicle wheels, by means of which the rim members and tire are securely locked or fastened to the felly of the wheel, and the tire maintained in proper position.

While I have illustrated the invention as applied to a wheel of the pneumatic-tire type, it will be understood that the locking device is also applicable for use with other types of wheels, and I therefore do not limit myself to the particular illustrated form of the invention.

In the process of demounting and applying tires of automobile and other wheels, the difficulties encountered are well known to users and owners of such vehicles, and the purpose of my invention is to provide a simple construction of fastening and locking means for the tire and felly, which may with facility and convenience be manipulated by one person when putting on or taking off the tire from the rim.

By the utilization of my invention I am enabled to furnish a rim locking device employing a minimum number of parts, combined and arranged to retain the tire, and which forms a rigid, strong, and durable support for the wheel.

To this end the invention contemplates a lug ring or locking ring, which serves in lieu of the series of locking lugs usually employed on automotive vehicle wheels, and which may be turned or rotated to locked or unlocked position in connection with bolt heads or locking lugs supported on the felly of the wheel, for the purpose of locking the tire to the felly. And the invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention. It will be understood that changes and alterations may be made in the illustrated construction, within the scope of my appended claim without departing from the spirit of my invention.

Figure 1 is a transverse sectional view through a wheel of the pneumatic tire type equipped with the locking device of my invention.

Figure 2 is a view showing the inner face of a portion of the lug ring, a locking bolt in section, and illustrating one of the locking latches.

Figure 3 is a sectional view of that portion of the lug ring shown in Figure 4, illustrating the cam or wedge action of the lug ring on a bolt head or lug.

Figure 4 is a view in side elevation of an automobile wheel equipped with the device of my invention.

Figure 5 is a view showing a key or tool which may be used in connection with the lug ring.

In order that the invention may readily be understood I have shown a standard or well known type of pneumatic-tire wheel with the usual casing 1 and inner tube 2, and the circumferentially divided channel-rim divided in two sections 3 and 4 for retaining the beaded edges of the walls of the outer casing 1.

The felly 5 is illustrated as a well known type of wood ring or band, and the usual form of spokes 6 is employed.

On the outer periphery of the wood felly a felly band or wear ring 7 is attached, which ring is fashioned with an outer beveled face complementary to the inner beveled face of the rim 3—4, and the wear ring is also provided with a side, annular flange 7' for engaging and retaining the rim section 3 in place, as seen in Figure 1. It will be apparent that the tire and its rim are slipped over the beveled wear ring, from the right side, in Figure 1 in assembling the parts, and that the tire and rim may be demounted, when not otherwise secured, by withdrawal from the wear ring or felly band.

The flange 7' of the fixed wear ring is located at the inner side of the wheel, and a complementary retaining ring 8 is located at the opposite side or outer side of the wheel for engagement with the section 4 of the channel rim, the retaining ring 8 being adapted for close contact with the annular shoulder 8' of the section 4, and its inner periphery being substantially on a line with the outer periphery of the felly 5.

The lug ring 9, which is used for locking these parts in place is preferably of brass, and is fashioned to conform to the shape of the felly and retaining ring 8, the latter being engaged by the outer flange 10 of the lug ring. The lug ring is thus seated within the retaining ring 8 and may be turned or rotated therein, within limits, to lock or unlock the tire to and from the felly.

As an anchor for the lug ring 9 I utilize a number of bolts 11, disposed at regular intervals around the felly and passed transversely through openings in the body thereof. These bolts are fashioned with T-heads or lugs 12 at one end, and their threaded ends which project through the felly at its inner side are provided with lock nuts 13 of suitable type for securing the bolts in place. The T-heads or lugs on the bolts project from the outer face of the felly as shown in Figure 1, and at their inner sides these lugs forming the T-heads are fashioned with cam faces 14.

At its inner side, the lug ring 9 is provided with a series of spaced T-slots coincident in number with the T-lugs or T-heads on the bolts 11, it being understood that the heads or lugs extend in radial lines from the center of the wheel, and that the radially extending portions of the complementary series of T-slots are adapted to be slipped over the heads or lugs. The bolts, adjacent their heads are adapted to act as guides in co-action with the circumferentially extending parts of the T-slots, as the lug ring is turned. Pockets 16 are formed in the T-slots, at the inner and outer sides of the circumferentially extending portions of these slots, and these pockets also extend in a circumferential direction through a portion of the lug ring. The inner walls 17 of the pockets are fashioned as cam faces for co-action with the complementary faces 14 of the lugs 12, and as the lug ring is turned to the right in Figure 4, it will be apparent that cam faces 17 will ride across the complementary faces 14 of the lugs to secure a wedging action between the lugs and the walls of the pockets, as in Figure 3, to fasten the lug ring on the felly. In this manner the retaining ring 8 is forced into close contact with the rim section 4, and as the lug ring is fastened to the felly the tire and felly are fastened together.

To prevent accidental displacement of the lug ring, the ring is provided with a series of latches 18, one for each bolt 11, and the latches are carried in recesses 19 formed in the face of the inner side of the lug ring, but of less depth than the slots 15 and their pockets 16. Each latch is pivoted as at 20, and a spring 21 urges the latch into engaged position with its bolt 11 as seen in Figure 2. Preferably only two of the bolts are provided with latches, as it is found that this number of latches will be sufficient to lock the bolts and lug ring against relative movement.

At 22 the front end of the latch may be fashioned with a cam face which is adapted to ride up and over the bolt 11 as the lug ring is turned to locking position, the latch being opened by this movement against the tension of the spring 21. But immediately after the latch has passed over the bolt, the spring returns the latch to position of Figure 2 to lock the bolts and lug ring together.

A key hole 23 extends transversely through the lug ring adjacent to the latch, and the latch may be provided with a cam face or edge 24 with which the key 25 co-acts. Thus the key may be slipped through the key hole, from the outer side of the wheel, and by turning the key the latch may be released from its bolt, after which the lug ring may be turned backward to disengage the walls of the pockets from the cam lugs or heads of the bolts. Two of these keys may be used, and each key may have a bar 26, as seen in Figure 5, which when placed in the complementary socket 27 in the outer face of the lug ring, may be utilized to secure leverage in turning the lug ring for disengaging the ring as well as for the purpose of engaging it with the T-lugs.

From the above description taken in connection with my drawings, it will be apparent that I have provided a comparatively inexpensive device, which is simple in construction and operation, may be manipulated with facility and is efficient in performing its required functions.

Having thus fully described my invention, what I claim and desire to secure by Letters Patent is:—

The combination with a wheel rim and felly and a plurality of bolts in said felly having projecting T-heads, a retaining ring engaging said rim and cam faces on said T-heads, of a lug ring having complementary T-slots and cam faces therein for co-action with said heads when the ring is turned, spring pressed latches carried by said lug ring to engage said bolts, and means for releasing said latches.

In testimony whereof I have affixed my signature.

AUGUST T. J. BAHR.